Figure 1:
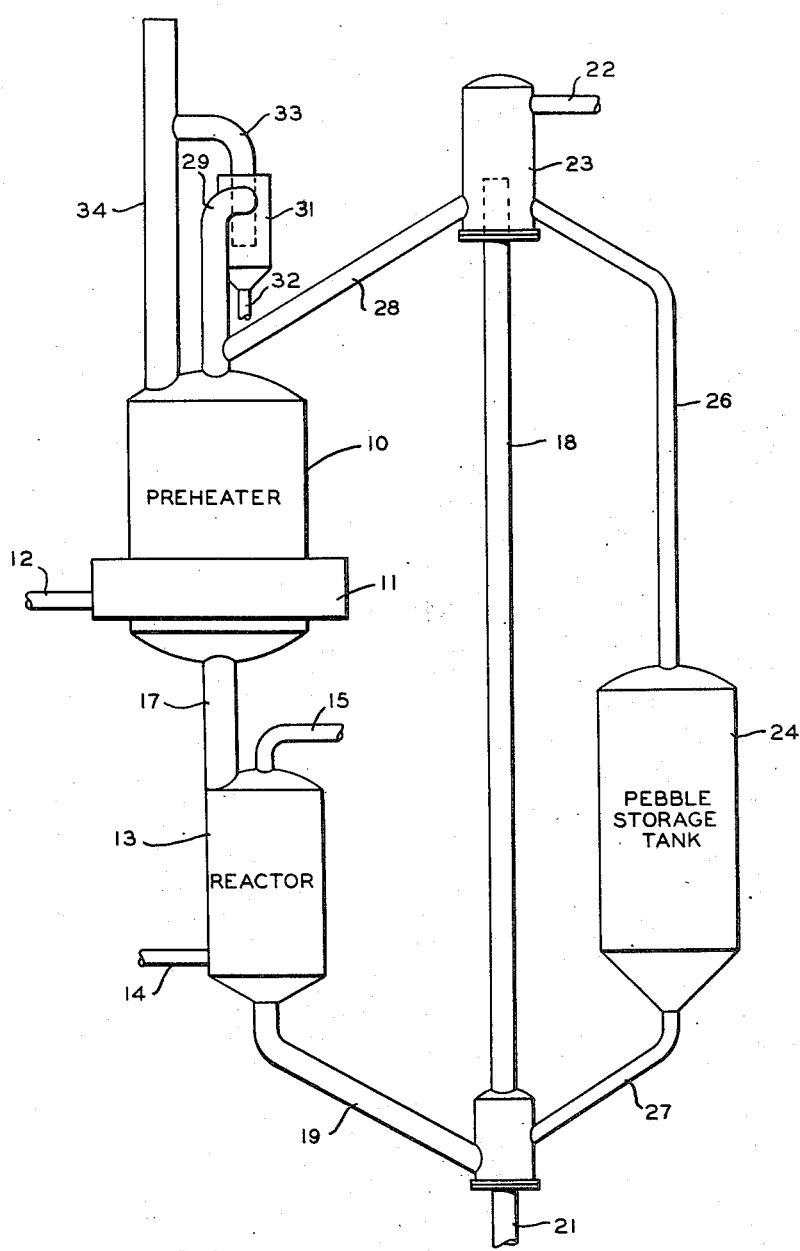

Feb. 26, 1957 D. S. HALL ET AL 2,782,924
PEBBLE HEATING APPARATUS AND METHOD OF
REMOVING FINES FROM PEBBLE FEED
Filed March 15, 1954 2 Sheets-Sheet 1

INVENTOR.
D. S. HALL
C. E. FORKEL
BY
Hudson and Young
ATTORNEYS

INVENTOR.
D. S. HALL
C. E. FORKEL
BY Hudson and Young
ATTORNEYS

United States Patent Office 2,782,924
Patented Feb. 26, 1957

2,782,924

PEBBLE HEATING APPARATUS AND METHOD OF REMOVING FINES FROM PEBBLE FEED

Dick S. Hall, Phillips, Tex., and Curt E. Forkel, Bartlesville, Okla., assignors to Phillips Petroleum Company, a corporation of Delaware Application March 15, 1954, Serial No. 416,054

5 Claims. (Cl. 209—138)

This invention relates to pebble heater apparatus. In one of its more specific aspects, this invention relates to means for removing fines from the pebbles in pebble heater apparatus. In another of its more specific aspects, the invention relates to a particular type of pebble surge chamber.

Thermal conversion processes carried on in so-called pebble heating apparatus utilize a flowing mass of pebbles which is heated to a high temperature in a first direct heat exchange step and is then caused to contact gaseous materials, furnishing heat thereto, in a second direct heat exchange step. The conventional pebble heater apparatus comprises two chambers which may be disposed in substantially vertical alignment. Solid heat exchange material, such as refractory pebbles, is introduced into the upper portion of the upper chamber. The solid heat exchange material flows downwardly through the chamber in direct heat exchange with a hot gaseous heat exchange material. The solid heat exchange material is heated to a high temperature in such heat exchange and is then passed to a second chamber in which it is caused to contact gaseous materials in a second direct heat exchange relation, furnishing heat to such materials.

The term "pebble," as used herein, denotes any solid refractory material of flowable form, size, and strength which is suitable to carry large amounts of heat from the pebble heating chamber to the gas heating chamber. Pebbles conventionally used in pebble heater apparatus are substantially spherical in shape and are from about one-eighth inch to about one inch in diameter. In high temperature processes, pebbles having a diameter of approximately three-eighths inch are preferred. The pebbles must be formed of a refractory material which will withstand temperatures at least as high as the highest temperature attained in the pebble heating chamber. The pebbles must also be capable of withstanding temperature changes within the apparatus. A refractory material, such as a metal or metal alloy, ceramic, or other satisfactory material, may be utilized to form such pebbles. Satisfactory pebbles may be formed of silicon carbide, alumina, periclase, beryllia, stellite, zirconia, and mullite in admixture with each other or with other materials. Pebbles formed of such materials, when properly fired, serve very well in high temperatures, some withstanding temperatures up to about 3500° F. Pebbles which are inert or catalytic may be used in any selected process.

Figure 2:
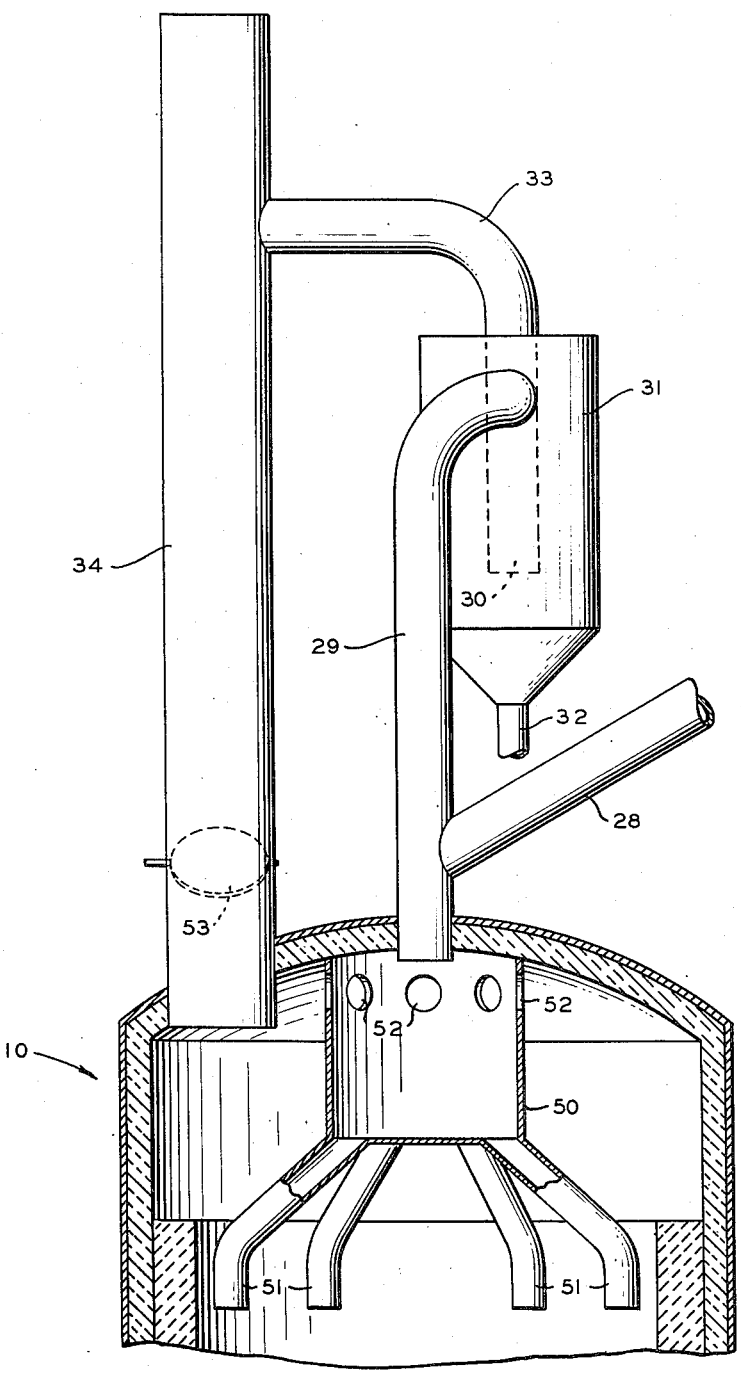

In the operation of apparatus of this type, the pebbles have a tendency to break up and, furthermore, are abraded, both of these effects resulting in the formation of fines. We have invented apparatus which permits the operation of a new method for the removal of these fines. This apparatus is illustrated in the accompanying drawing comprising:

Figure 1, illustrating a schematic diagram of a complete pebble heater-reactor combination and the associated apparatus, and, Figure 2, which is an enlarged view, partly in section, of the upper portion of the pebble heater chamber.

Each of the following objects is obtained by at least one of the aspects of this invention.

An object of this invention is to provide improved pebble heater apparatus.

A further object of this invention is to provide a method of removing fines from the pebbles in such apparatus.

A further object of this invention is to provide an improved surge chamber which permits operation according to the method of this invention.

Other objects and advantages will be apparent to those skilled in the art upon reading this disclosure.

According to this invention, the pebble surge chamber is provided with at least one opening in the upper portion thereof above the pebble layer therein. A portion of the flue gas used to heat the pebbles in the heater chamber passes through these holes and through the tube through which pebbles are supplied to the preheater. This gas flows with sufficient velocity to carry the fines to an elutriator.

While omitting certain features known in the art, such as flow control valves and other control apparatus, I have illustrated the complete apparatus in Figure 1, which is a schematic representation. In this drawing, the preheater 10 is provided with a furnace 11 associated with the lower portion thereof, this furnace having fuel gas supply conduit 12 communicating therewith. Positioned below preheater 10 is reactor 13, having feed conduit 14 communicating with one end portion thereof, and product removal conduit 15 communicating with the other end portion thereof. Pebble supply conduit 17 connects the lower end portion of preheater 10 with the upper end portion of reactor 13. Positioned beside chambers 10 and 13 is pebble elevator 18. Extending from the lower end portion of reactor 13 is pebble conduit 19 which extends therefrom to the lower end portion of elevator 18. In Figure 1, elevator 18 is illustrated as a gas lift elevator, being provided with gas inlet 21 and gas outlet 22. The flow of gas upwardly therethrough carries the pebbles upwardly to chamber 23. It will be obvious that other types of elevators, such as a bucket elevator, could be substituted for elevator 18, if desired, by those skilled in the art. Also shown in Figure 1 is pebble storage tank 24. Conduit 26 connects chamber 23 and the upper end of pebble storage tank 24 and conduit 27 connects the lower end of tank 24 with elevator 18. A conduit 28 is provided connecting chamber 23 and conduit 29, conduit 29 extending into the pebble surge chamber. The upper end of conduit 29 communicates with elutriator 31. Elutriator 31 is an open chamber having a solid material removal conduit 32 in the lower portion thereof and gaseous material removal conduit 33, this conduit 33 extending into elutriator 31 and extending almost to the bottom end thereof. Preheater 10 is provided with a stack 34 and conduit 33 communicates therewith at a point above elutriator 31.

In Figure 2, we have shown an enlarged view, partly in section, of the upper portion of pebble heater 10. The reference numerals in Figure 2 correspond to those in Figure 1. This figure illustrates the pebble surge chamber 50 in detail, this chamber being positioned directly below conduit 29 and being provided with a plurality of pebble distribution conduits 51. The surge designed in this fashion feeds pebbles to the outside of the chamber thus giving a better heat transfer than one central feed. Also the top of the contiguous pebble bed is maintained within the surge by adding pebbles from storage and thus keeps the same height of bed in the preheater, which provides constant pressure drop and constant firing. In this invention, a series of holes 52 are provided in the upper walls at a level above the highest level of pebbles in this chamber, the flow of pebbles to this chamber being controlled by a valve in conduit 19 (not shown). Most pebbles assume an angle of repose such that the upper surface thereof and the horizon define an angle of 20 to 30°. Knowing this angle and position of the lower end of conduit 29, the position of holes 52 is easily determined.

In the operation of this invention, pebbles having previously been lifted to chamber 23, roll freely to the pebble preheater 10 through conduit 28. In the usual operation, a gas is burned within this chamber for heating the pebbles therein. The major proportion of the resultant flue gas is passed to the atmosphere through stack 34. However, a portion of this flue gas enters surge chamber 50 through holes 52, the amount passing through said surge being controlled by valve 53, this gas passing upwardly through conduit 29. Dust and pebble fragments are picked up by this gas within conduit 29 and carried upwardly by the gas to elutriator 31. Since the gas passes countercurrent to the entire volume of pebble feed, we are able to remove substantially all of the fines, which would otherwise be introduced into pebble heater 10. The elutriator gas carrying these fines is preferably introduced tangentially to the enlarged section of elutriator 31, this enlarged section providing a zone of decreased velocity. The flow of gas is around the walls of this chamber and downwardly to the bottom 30 of conduit 33. As the gases change direction to flow upwardly through conduit 33, the fines are thrown out of the gas by centrifugal force and fall down to the bottom of elutriator 31. These fines are then removed through conduit 32, the flue gas passing upwardly through conduit 33 where it is, most advantageously, introduced into stack 34 through which it is passed to the atmosphere.

The position of valve 53 in stack 34 controls the amount of flue gas entering pebble surge chamber 50 and, consequently, the amount of gas passing upwardly through conduit 29. If more gas passes through conduit 29, its velocity increases and it is able to remove fines of greater mass. This provides control over the amount and size of the fines removed.

As many possible embodiments may be made of this invention without departing from the scope thereof, it is to be understood that all matter herein set forth or shown in the accompanying drawings is to be interpreted as illustrative and not as unduly limiting the invention.

We claim:

1. In a pebble heater apparatus utilizing a moving bed of pebbles, a pebble heater chamber comprising an upright closed shell; a pebble outlet in the lower portion thereof; a stack extending from the upper portion thereof; a pebble surge chamber within the upper portion of said shell, said pebble surge chamber being provided with a plurality of pebble outlet conduits and at least one opening in the side thereof at a level above the pebble layer therein; an elutriator positioned in proximity to the upper portion of said preheater, said elutriator comprising an outer shell, an outlet extending upwardly from a point within the lower portion of the chamber formed by said shell, an outlet extending downwardly from the bottom of said shell, and an inlet extending into the chamber formed by said shell at a point above the lower end of said upwardly extending outlet; a conduit extending from the upper portion of said pebble surge chamber to the inlet of said elutriator; and a pebble supply conduit extending into said last named conduit.

2. The apparatus of claim 1 wherein the upwardly extending outlet of said elutriator communicates with said stack.

3. The method of removing fines from the pebble feed to a pebble preheating zone, the feed system of which includes a pebble supply zone extending into a pebble surge zone in the upper portion of said preheating zone, comprising supplying flue gas to said pebble surge zone at a level above the pebbles therein, passing said gas through pebbles being supplied to said preheating zone, controlling the flow of said gas to provide an amount sufficient to remove fines of a predetermined size from said pebble feed, said gas carrying fines to a zone of decreased velocity, removing and recovering fines from said gas in said zone of reduced velocity, and exhausting said gas from said zone of decreased velocity.

4. In a pebble heater apparatus utilizing a moving bed of pebbles, a pebble heater chamber comprising an upright closed shell; a pebble outlet in the lower portion thereof; a pebble surge chamber within the upper portion of said shell, said pebble surge chamber being provided with at least one pebble outlet conduit and at least one opening in the side thereof at a level above the pebble layer therein; a conduit extending upwardly from the upper portion of said pebble surge chamber; and a pebble supply conduit extending into said last named conduit.

5. The method of removing fines from the pebble feed to a pebble heating zone, the feed system of which includes a pebble supply zone extending into a pebble surge zone in the upper portion of said preheating zone, comprising supplying gas from said pebble treating zone to said pebble surge zone at a level above the pebbles therein, passing said gas through pebbles supplied to said treating zone, controlling the flow of said gas to provide an amount sufficient to remove fines of predetermined size from said pebble feed and removing said fines from said pebble feed.

References Cited in the file of this patent

UNITED STATES PATENTS

| | | |
|---|---|---|
| 2,421,840 | Lechthaler et al. | June 10, 1947 |
| 2,509,854 | Bailey et al. | May 30, 1950 |
| 2,511,463 | Claasen | June 13, 1950 |
| 2,538,472 | Robinson | Jan. 16, 1951 |